United States Patent
Schröder-Brumloop et al.

[11] Patent Number: 5,682,022
[45] Date of Patent: Oct. 28, 1997

[54] ACTIVE STABILIZATION OF SERIALLY CONNECTED CAPACITORS IN HIGH VOLTAGE APPLICATIONS

[75] Inventors: Helmut Lothar Schröder-Brumloop; Sven-Oliver Rainer Kersten, both of Berlin, Germany

[73] Assignee: Otis Elevator Company, Farmington, Conn.

[21] Appl. No.: 439,528

[22] Filed: May 11, 1995

[51] Int. Cl.$^6$ .................................. B66B 1/06; H01J 10/44
[52] U.S. Cl. .................................. 187/296; 187/393; 320/1
[58] Field of Search .................................. 187/296, 289, 187/292, 393; 320/1, 6

[56] References Cited

U.S. PATENT DOCUMENTS

| | | | |
|---|---|---|---|
| 3,041,501 | 6/1962 | Willits | 320/1 |
| 4,545,464 | 10/1985 | Nomura | 187/29 R |
| 4,678,063 | 7/1987 | Kitaoka et al. | 187/119 |
| 5,063,340 | 11/1991 | Kalenowsky | 320/1 |

*Primary Examiner*—Robert Nappi

[57] ABSTRACT

An elevator drive circuit is used for maintaining the voltage across first and second serially connected capacitors having first and second ends. The circuit comprises an active stabilizer for substantially maintaining a predetermined value of the voltage at a connection node of the capacitors. The active stabilizer provides compensation in response to deviations from the predetermined value of the voltage at the connection node.

22 Claims, 3 Drawing Sheets

5,682,022

1

ACTIVE STABILIZATION OF SERIALLY CONNECTED CAPACITORS IN HIGH VOLTAGE APPLICATIONS

TECHNICAL FIELD

The present invention relates generally to the stabilization of voltages in high voltage applications and, in particular, relates to the stabilization of voltages in elevator inverter drive applications.

BACKGROUND

Capacitors are often used to reduce high frequency noise and smooth DC supply voltages. This is especially beneficial in elevator drive inverters where high frequency noise is produced by the fast switching speeds of the SCRs.

Capacitors are rated by the maximum operating voltage at which the capacitor may safely operate. If the operating voltage exceeds the capacitor's maximum rated voltage, damage to the capacitor and its surrounding circuitry may result. Capacitors with a high voltage rating, however, are both large and expensive. Consequently, in high voltage applications, such as elevator drive inverters, the operating voltage of the application may exceed the maximum voltage of suitably priced and sized capacitors.

As a result, capacitors are typically connected in series in high voltage applications so that capacitors with smaller maximum voltage ratings may be utilized. For efficient use of the capacitors, the overall voltage must be split according to the each of the capacitors' operating voltages. For example, a two-capacitor series arrangement with capacitors having similar maximum voltage ratings may be used such that the voltage across each capacitor is stabilized to one half of the supply voltage. Nevertheless, the internal DC resistance of the capacitors is a value which varies in a wide range depending on the particular operating conditions and the manufacturing process of the capacitor; this may induce irregularities in the voltage distribution across the capacitors and cause maximum ratings to be exceeded.

A resistor voltage divider network may be used to stabilize the capacitor voltages, but the current through the resistors in the divider must be 5–10 times the leakage current in the capacitors to achieve the desired result. Moreover, the high current through the resistors produces increased power dissipation and heat in the application. However, low temperatures are needed for reliability and increased lifetime of the capacitors.

For the foregoing reasons, there is a need for a providing improved stabilization and smoothing of DC supply voltages in high voltage applications, and it is to this end that the present invention is directed.

DISCLOSURE OF THE INVENTION

It is an object of the present invention to provide improved stabilization and smoothing of DC supply voltages in high voltage applications.

It is another object of the present invention to increase reliability, efficiency and lifetime of electronic circuits in high voltage applications.

According to the present invention, an active stabilizer is used for maintaining the voltage across a capacitor arrangement. The active stabilizer substantially maintains a predetermined value of the voltage at a connection node of the capacitor arrangement by providing compensation in response to deviations from the predetermined value of the voltage at the connection node.

2

In one preferred embodiment, the active stabilizer is used in an elevator drive application so that the voltage at a connection node of DC link capacitors is substantially maintained to a predetermined value.

The present invention provides the advantage of increased reliability, efficiency and lifetime resulting from significant decreases in power dissipation. Additionally, the present invention reduces costs by requiring less space and less cooling effort in a high voltage application.

BRIEF DESCRIPTION OF THE DRAWINGS

These and other features, aspects and advantages of the present invention will become better understood with regard to the following description, appended claims and accompanying drawings where:

BEST MODE FOR CARRYING OUT THE INVENTION

Figure 1:
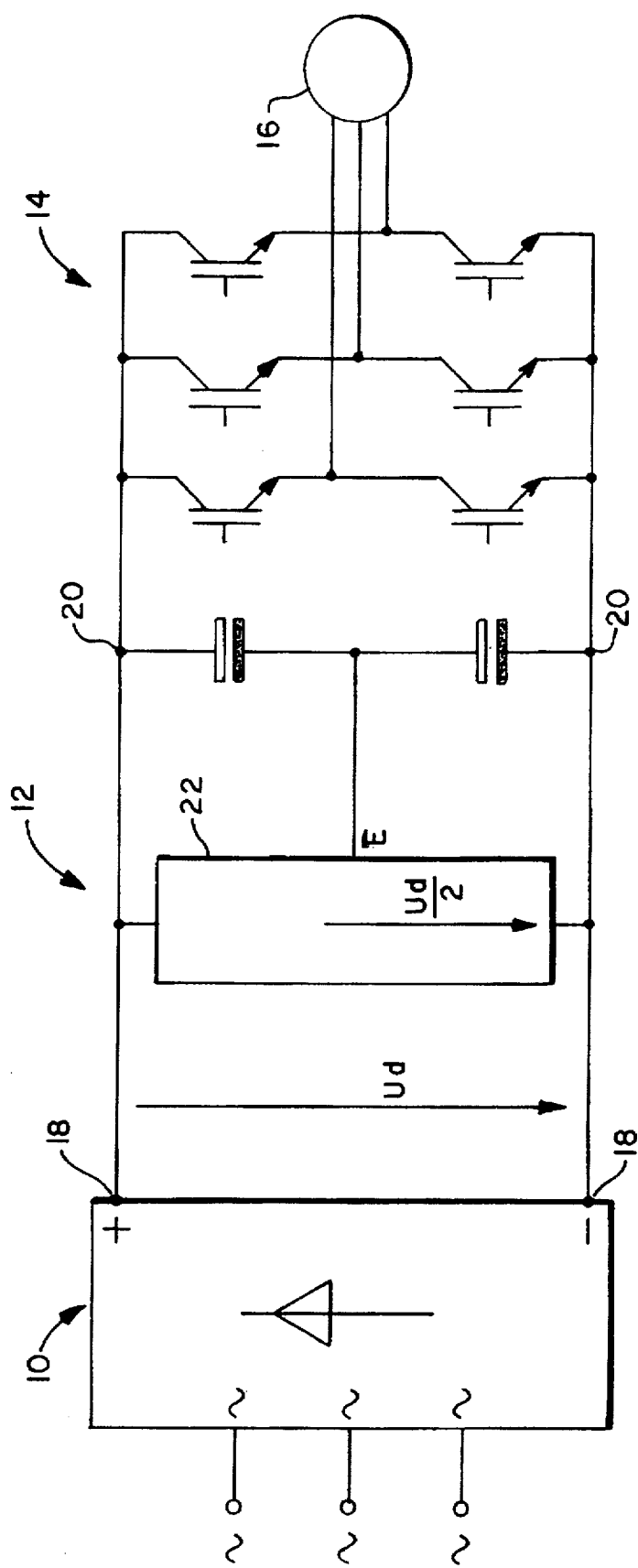
FIG. 1 is a circuit diagram of an elevator drive employing the present invention.

Referring to FIG. 1, a preferred embodiment of the present invention used in an elevator drive application is shown. The elevator drive has an AC-line rectifier 10, a DC link 12, a three phase inverter 14 and an AC motor 16. As is well known, the rectifier 10 is connected to a power source (not shown) so as to received therefrom a three phase alternating current which is rectified into direct current. The rectifier 10 thus has a pair of DC terminals 18 connected to DC terminals 20 of the inverter 14. The inverter 14 converts the DC current received from the rectifier 10 into three phase alternating current which is supplied to the motor 16. The DC link 12 is connected across the DC terminals 18 of the rectifier 10. An active stabilizer 22 is connected across the DC terminals 18 of the rectifier 10 and is explained in detail hereinbelow.

Figure 2:
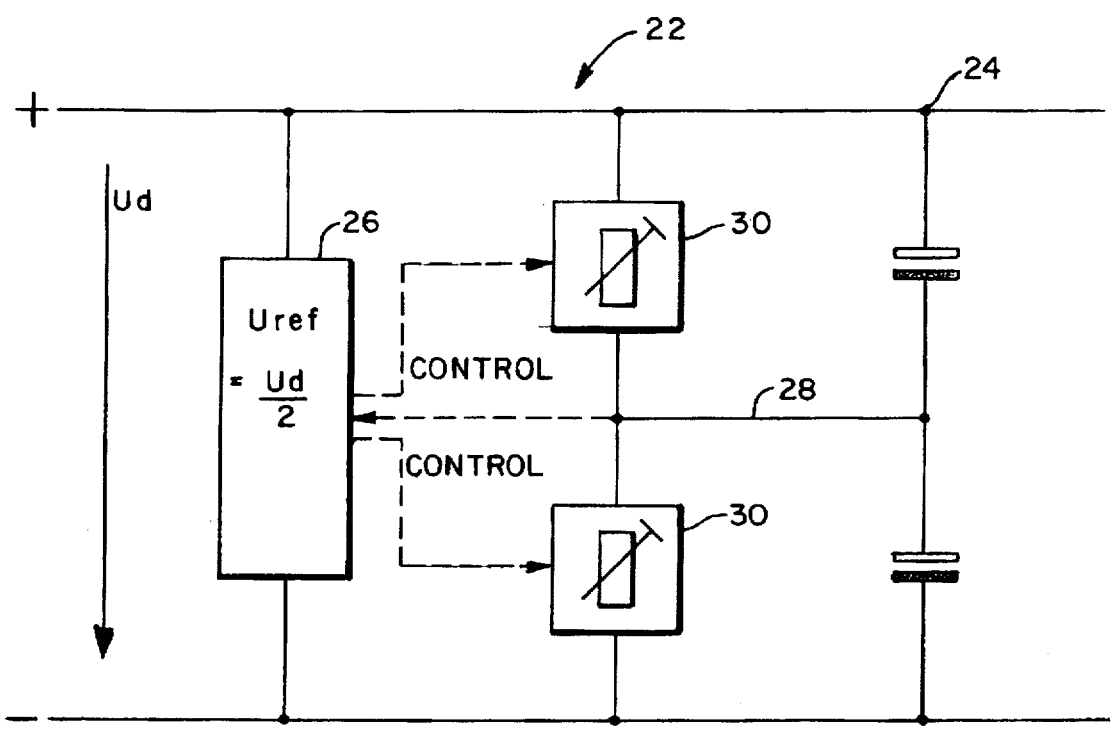
FIG. 2 is a functional block diagram of the present invention.
Figure 3:
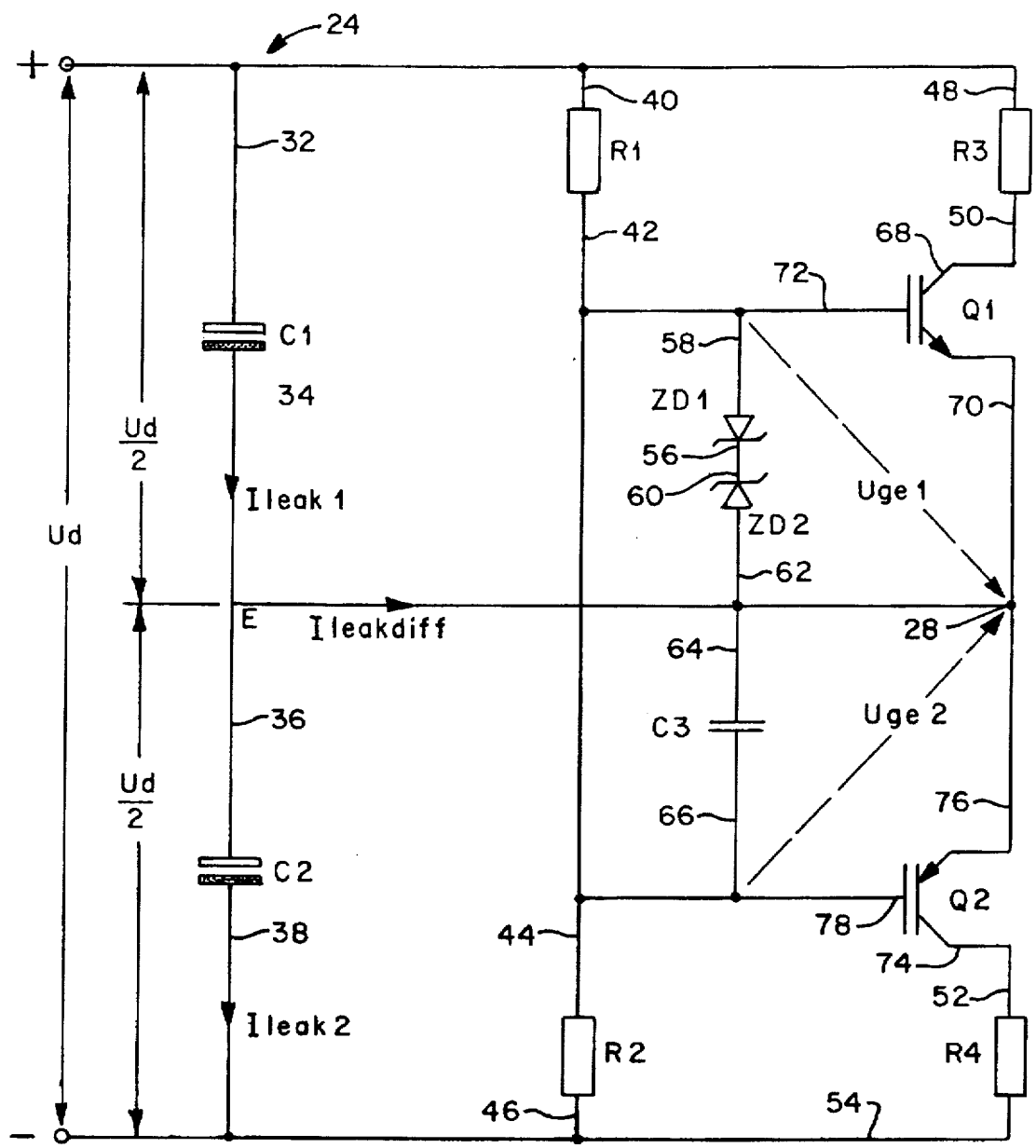
FIG. 3 is a schematic representation of a preferred embodiment of the present invention.

Referring to FIG. 2, a functional block diagram of the present invention is shown. The input voltage Ud is applied across the active stabilizer 22 and a capacitor arrangement 24. A voltage divider 26 provides a voltage reference Uref. In a preferred embodiment, the value of the reference voltage Uref is equal to half of the voltage across the DC terminals 18 of the rectifier 10. The capacitor arrangement 24 is electrically connected to the active stabilizer 22 and provides an intermediate voltage signal 28 to the active stabilizer 22. The active stabilizer 22 is responsive to the intermediate voltage signal 28 such that if the value of the intermediate voltage signal 28 deviates from the reference voltage Uref above or below a predetermined value the active stabilizer 22 provides compensation for the deviation. For example, as illustrated in FIG. 3, if the value of the intermediate voltage signal 28 deviates above or below a reference value of the reference voltage Uref by a determined value Uge1, Uge2, the active stabilizer 22 provides compensation for the deviation as is explained in detail below. Variable attenuators 30 are used to provide the compensation and are controlled so that the value of the intermediate voltage signal 28 is maintained substantially equivalent to the predetermined value of the reference voltage Uref as is explained hereinbelow.

Referring to FIG. 3, a preferred embodiment of the present invention is shown. The capacitor arrangement 24 includes first and second serially connected capacitors C1, C2 which have similar maximum voltage ratings. Each capacitor C1, C2 has a first and second end such that the second end 34 of the first capacitor C1 is electrically connected to the first end 36 of the second capacitor C2. The voltage Ud is applied across the serially connected capacitors C1, C2. The capacitors C1, C2 have an associated leakage current Ileak1 or Ileak2. The capacitor arrangement 24 provides an Ileakdiff current signal which is equivalent to the absolute value of Ileak1–Ileak2. The value of the intermediate voltage signal 28 provided by the capacitor arrangement 24 represents the voltage at node E. It should be understood by one of ordinary skill in the art that the capacitor arrangement 24 may include additional capacitors.

The active stabilizer 22 includes a first transistor device Q1, a second transistor device Q2, a first resistor R1, a second resistor R2, a third resistor R3 and a fourth resistor R4 which are electrically connected as is described below. A first zener diode ZD1, a second zener diode ZD2 and a third capacitor C3 are electrically connected to the active stabilizer 22 as is described below.

Each transistor device Q1, Q2 includes a collector, an emitter and a gate. The resistors R1, R2, R3, R4, zener diodes ZD1, ZD2 and the third capacitor C3 each include first and second ends. The emitter 70 of the first transistor device Q1 is electrically connected to the second end 34 of the first capacitor C1. The emitter 70 of the first transistor device Q1 is electrically connected to the emitter 76 of the second transistor device Q2. The first end 40 of the first resistor R1 is electrically connected to the first end 32 of the first capacitor C1 and the second end 42 of the first resistor R1 is electrically connected to the gate 72 of the first transistor device Q1. The first end 44 of the second resistor R2 is electrically connected to the gate 78 of the second transistor device Q2 and the second end 46 of the second resistor R2 is electrically connected to the second end 38 of the second capacitor C2. The first end 48 of the third resistor R3 is electrically connected to the first end 40 of the first resistor R1 and the second end 50 of the third resistor R3 is electrically connected to the emitter 70 of the first transistor device Q1. The first end 52 of the forth resistor R4 is electrically connected to the collector 74 of the second transistor device Q2 and the second end 54 of the forth resistor R4 is electrically connected to the second end 46 of the second resistor R2. The first end 56 of the first zener diode ZD1 is electrically connected to the first end 60 of the second zener diode ZD2. The second end 58 of the first zener diode ZD1 is electrically connected to the gates 72, 78 of the first and second transistor devices Q1, Q2 and the second end 62 of the second zener diode ZD2 is electrically connected to the emitters 70, 76 of the first and second transistor devices Q1, Q2. The first end 64 of the third capacitor C3 is electrically connected to the emitters 70, 76 of the first and second transistor devices Q1, Q2 and the second end 66 of the third capacitor C3 is electrically connected to the gates 72, 78 of the first and second transistor device Q1, Q2.

To use the capacitors C1, C2 efficiently, the overall voltage across the capacitor arrangement 24 must be divided according to each of the capacitors' rated operating voltages. In the case of two similarly rated capacitors C1, C2, the voltage is divided equally. Accordingly, the first and second resistors R1, R2 form the voltage divider 26 which is used to provide the reference voltage Uref equal to Ud/2. A high ohmic value is chosen for both resistors R1, R2 such that a small current flows through the resistors R1, R2 which thus provides the advantage of low power losses. For example, a value of 400 kOhms is a suitable resistance value for the resistors R1, R2.

The active stabilizer 22 operates by responding to deviations in the value of the intermediate voltage signal 28. More specifically, if the value of the intermediate voltage signal 28 deviates more than the gate-emitter threshold Uge1 or Uge2 from Uref, the appropriate transistor Q1 or Q2 provides compensation by causing a compensation current to flow through its corresponding compensation resistor R3, R4 to compensate for the deviation as is explained below.

For example, in a preferred embodiment the following values are used: Ud=800 Vdc; Uref=400 vdc; R1=R2=400 kOhms; R3=R4=30 kOhms, Ileakdiff=10 mA and gate threshold voltage=Uge1=–Uge2=6V. If, due to non-symmetrical voltage distribution on the capacitors C1 and C2, the voltage across C2 increases above Ud/2 (400V), the gate-emitter voltage of Q2 increases. If the voltage deviation from the reference voltage Uref (400V) is sufficient to cause the gate-emitter voltage to exceed the gate threshold voltage (–6V), Q2 will cause a current to flowing through compensation resistor R4. Q1 will be off in this operation. Ileak1 will be distributed through C2 and R4. Ileakdiff flows through R4 and causes node E to have a voltage of U(E)= U(C2)=U(R4)+Uce2=(Ud*R2/(R1+R2))–Uge2. Thus, the compensation current Ileakdiff through the compensation resistor R4 causes the voltage at node E to adjust to a range within the gate threshold voltage of the reference voltage Uref. Accordingly, in a voltage range of Ud*R2/(R1+R2) ±Uge no transistor device is controlled to conduct. However, if the voltage deviation exceeds the reference voltage Uref±Uge, the according transistor Q1 or Q2 is controlled to conduction, so the difference in the leakage currents is compensated by an according current in R3 or R4. It should be understood by those skilled in the art that the values used in this best mode embodiment result from one specific implementation of the present invention and other values may be chosen without departing from the spirit and scope of the invention.

In one preferred embodiment, the transistor devices Q1, Q2 comprise IGBTs which offer a high impedance at the input (Gate-Emitter) which allows use of a very high impedance voltage divider 26 for Ud/2 with low power losses.

The capacitor C3 is the gate-emitter input capacitance of Q1 and Q2 in parallel. C3 depends on the transistors Q1, Q2 applied and could be increased by an external capacitor to adjust a time constant for smoothing the gate-emitter voltage.

The zener diodes ZD1, ZD2 are used to prevent overvoltage at the gates 72, 78 of the transistor devices Q1, Q2. For example, if the transistors Q1, Q2 are rated for a maximum gate-emitter voltage of 20V then 15V zener diodes may be used.

Thus, the present invention maintains the voltage at node E substantially constant to a predetermined voltage Uref; this provides for optimal usage of the capacitors C1, C2 by allowing each capacitor C1, C2 to function at safe operational voltages near their maximum voltage ratings. Additionally, the present invention substantially dissipates power resulting from the difference between the leakage currents Ileak1, Ileak2 of the capacitors C1, C2. The power losses in the present invention are approximately equal to (Ud^2/(R1+R2))+½Ud*Ileakdiff, wherein Ileakdiff equals the absolute value of [Ileak1–Ileak2]. Whereas, the power loss for a conventional resistive voltage divider network is approximately 2*[5 to 10*Ileakdiff*Ud/2]. Thus, the power loss of the active stabilizer 22 is reduced by approximately 10 to 20 times as compared to the conventional resistor divider network. Accordingly, reliability and lifetime is enhanced as a result of lower heat dissipation. The present invention also reduces cost because less space and cooling effort is needed.

Various changes to the above description may be made without departing from the spirit and scope of the present invention as would be obvious to one of ordinary skill in the art of the present invention.

What is claimed is:

1. An elevator drive circuit for stabilizing voltages in an elevator drive, said drive circuit comprising:

capacitor means for providing an intermediate voltage signal; and active stabilization means for substantially maintaining a predetermined value of the intermediate voltage signal, wherein said active stabilization means is responsive to the intermediate voltage signal such that if a value of the intermediate voltage signal deviates above or below a reference value by a determined value said active stabilization means provides compensation for the deviation.

2. An elevator drive circuit as recited in claim 1, wherein the compensation of said active stabilization means is accomplished by causing a compensation current to flow through a transistor device and a compensation resistor.

3. An elevator drive circuit as recited in claim 1, wherein said capacitor means comprises first and second capacitors electrically connected in series such that the intermediate voltage signal is provided at the electrical connection of said capacitors.

4. An elevator drive circuit as recited in claim 3, wherein said active stabilization means comprises a first transistor device having a collector, an emitter and a gate, the emitter of said first transistor device is electrically connected to the second end of the first capacitor; a second transistor device having a collector, an emitter and a gate, the emitter of said first transistor device is electrically connected to the emitter of said second transistor device; a first resistor having first and second ends, the first end of said first resistor is electrically connected to the first end of the first capacitor and the second end of said first resistor is electrically connected to the gate of said first transistor device; a second resistor having first and second ends, the first end of said second resistor is electrically connected to the gate of said second transistor and the second end of said second resistor is electrically connected to the second end of the second capacitor; a third resistor having first and second ends, the first end of said third resistor is electrically connected to the first end of said first resistor and the second end of said third resistor is electrically connected to the collector of said first transistor device; and a forth resistor having first and second ends, the first end of said forth resistor is electrically connected to the collector of said second transistor device and the second end of said forth resistor is electrically connected to the second end of said second resistor, wherein, said active stabilization means provides a compensation current in response to deviations from the predetermined value of the intermediate voltage signal.

5. An elevator drive circuit for stabilizing voltages, said apparatus comprising:

capacitor arrangement for providing an intermediate voltage signal;

active stabilizer for substantially maintaining a predetermined value of the intermediate voltage signal, wherein said active stabilizer is responsive to the intermediate voltage signal such that if a value of the intermediate voltage signal deviates above or below a reference value by a determined value said active stabilizer provides compensation for the deviation.

6. An elevator drive circuit as recited in claim 5, wherein the compensation of said active stabilizer is accomplished by causing a compensation current to flow through a transistor device and a compensation resistor.

7. An elevator drive circuit as recited in claim 5, wherein said capacitor arrangement comprises first and second capacitors electrically connected in series such that the intermediate voltage signal is provided at the electrical connection of said capacitors.

8. An elevator drive circuit as recited in claim 7, wherein said active stabilizer comprises a first transistor device having a collector, an emitter and a gate, the emitter of said first transistor device is electrically connected to the second end of the first capacitor; a second transistor device having a collector, an emitter and a gate, the emitter of said first transistor device is electrically connected to the emitter of said second transistor device; a first resistor having first and second ends, the first end of said first resistor is electrically connected to the first end of the first capacitor and the second end of said first resistor is electrically connected to the gate of said first transistor device; a second resistor having first and second ends, the first end of said second resistor is electrically connected to the gate of said second transistor and the second end of said second resistor is electrically connected to the second end of the second capacitor; a third resistor having first and second ends, the first end of said third resistor is electrically connected to the first end of said first resistor and the second end of said third resistor is electrically connected to the collector of said first transistor device; and a forth resistor having first and second ends, the first end of said forth resistor is electrically connected to the collector of said second transistor device and the second end of said forth resistor is electrically connected to the second end of said second resistor, wherein, said active stabilizer provides a compensation current in response to deviations from the predetermined value of the intermediate voltage signal.

9. A voltage stabilization circuit for stabilizing voltages, said apparatus comprising:

capacitor arrangement for providing an intermediate voltage signal; and active stabilizer for substantially maintaining a predetermined value of the intermediate voltage signal, wherein said active stabilizer is responsive to a value of the voltage at the connection node such that if the value of the voltage at the connection node deviates above or below the determined value of the voltage at the connection node by a determined value said active stabilizer provides compensation for the deviation.

10. A voltage stabilization circuit as recited in claim 9, wherein the compensation of said active stabilizer is accomplished by causing a compensation current to flow through a transistor device and a compensation resistor.

11. A voltage stabilization circuit as recited in claim 9, wherein said capacitor arrangement comprises first and second capacitors electrically connected in series such that the intermediate voltage signal is provided at the electrical connection of said capacitors.

12. A voltage stabilization circuit as recited in claim 11, wherein said active stabilizer comprises a first transistor device having a collector, an emitter and a gate, the emitter of said first transistor device is electrically connected to the second end of the first capacitor; a second transistor device having a collector, an emitter and a gate, the emitter of said first transistor device is electrically connected to the emitter of said second transistor device; a first resistor having first and second ends, the first end of said first resistor is electrically connected to the first end of the first capacitor and the second end of said first resistor is electrically connected to the gate of said first transistor device; a second resistor having first and second ends, the first end of said second resistor is electrically connected to the gate of said second transistor and the second end of said second resistor is electrically connected to the second end of the second capacitor; a third resistor having first and second ends, the first end of said third resistor is electrically connected to the first end of said first resistor and the second end of said third resistor is electrically connected to the collector of said first transistor device; and a forth resistor having first and second ends, the first end of said forth resistor is electrically connected to the collector of said second transistor device and the second end of said forth resistor is electrically connected to the second end of said second resistor, wherein, said active stabilizer provides a compensation current in response to deviations from the predetermined value of the intermediate voltage signal.

13. An elevator drive circuit for maintaining the voltage across first and second serially connected capacitors disposed in an elevator drive, each capacitor having first and second ends, said drive circuit comprising an active stabilizer for substantially maintaining a determined value of the voltage at a connection node of the capacitors, wherein said active stabilizer is responsive to a value of the voltage at the connection node such that if the value of the voltage at the connection node deviates above or below the determined value of the voltage at the connection node by a determined value said active stabilizer provides compensation for the deviation.

14. An elevator drive circuit for controlling the voltage across first and second capacitors electrically connected in series such that an intermediate voltage signal is provided at the electrical connection of the first and second capacitors, each capacitor having first and second ends, said control circuit comprising:
- a first transistor device having a collector, an emitter and a gate, the emitter of said first transistor device is electrically connected to the second end of the first capacitor;
- a second transistor device having a collector, an emitter and a gate, the emitter of said first transistor device is electrically connected to the emitter of said second transistor device;
- a first resistor having first and second ends, the first end of said first resistor is electrically connected to the first end of the first capacitor and the second end of said first resistor is electrically connected to the gate of said first transistor device;
- a second resistor having first and second ends, the first end of said second resistor is electrically connected to the gate of said second transistor and the second end of said second resistor is electrically connected to the second end of the second capacitor;
- a third resistor having first and second ends, the first end of said third resistor is electrically connected to the first end of said first resistor and the second end of said third resistor is electrically connected to the collector of said first transistor device; and
- a forth resistor having first and second ends, the first end of said forth resistor is electrically connected to the collector of said second transistor device and the second end of said forth resistor is electrically connected to the second end of said second resistor;

wherein, said drive circuit provides compensation in response to deviations from a predetermined value of a intermediate voltage signal provided by the capacitors.

15. An elevator drive circuit as recited in claim 14, wherein said first transistor device provides the compensation current if the value of the intermediate voltage signal deviates more than a gate threshold voltage of said first transistor device and said second transistor device provides the compensation current if the value of the intermediate voltage signal deviates more than a gate threshold voltage of said second transistor device.

16. An elevator drive circuit as recited in claim 1 wherein said active stabilization means comprises a first transistor device and a second transistor device, said first transistor device provides a compensation current if the value of the intermediate voltage signal deviates more than a threshold voltage of said first transistor device and said second transistor device provides a compensation current if the value of the intermediate voltage signal deviates more than a threshold voltage of said second transistor device.

17. An elevator drive circuit as recited in claim 5 wherein said active stabilizer comprises a first transistor device and a second transistor device, said first transistor device provides a compensation current if the value of the intermediate voltage signal deviates more than a threshold voltage of said first transistor device and said second transistor device provides a compensation current if the value of the intermediate voltage signal deviates more than a threshold voltage of said second transistor device.

18. A voltage stabilization circuit as recited in claim 9 wherein said active stabilizer comprises a first transistor device and a second transistor device, said first transistor device provides a compensation current if the value of the intermediate voltage signal deviates more than a threshold voltage of said first transistor device and said second transistor device provides a compensation current if the value of the intermediate voltage signal deviates more than a threshold voltage of said second transistor device.

19. An elevator drive circuit as recited in claim 13 wherein said active stabilizer comprises a first transistor device and a second transistor device, said first transistor device provides a compensation current if the value of the intermediate voltage signal deviates more than a threshold voltage of said first transistor device and said second transistor device provides a compensation current if the value of the intermediate voltage signal deviates more than a threshold voltage of said second transistor device.

20. An elevator drive circuit as recited in claim 2 wherein the compensation current comprises a difference of a first leakage current provided by said capacitor means and a second leakage current provided by said capacitor means.

21. An elevator drive circuit as recited in claim 6 wherein the compensation current comprises a difference of a first leakage current provided by said capacitor arrangement and a second leakage current provided by said capacitor arrangement.

22. An elevator drive circuit as recited in claim 10 wherein the compensation current comprises a difference of a first leakage current provided by said capacitor arrangement and a second leakage current provided by said capacitor arrangement.

* * * * *